US011012436B2

(12) United States Patent
Hamel et al.

(10) Patent No.: US 11,012,436 B2
(45) Date of Patent: May 18, 2021

(54) SHARING CREDENTIALS

(71) Applicant: Workday, Inc., Pleasanton, CA (US)

(72) Inventors: Bjorn Hamel, Dublin, CA (US); Jonathan David Ruggiero, Danville, CA (US)

(73) Assignee: Workday, Inc., Pleasanton, CA (US)

(*) Notice: Subject to any disclaimer, the term of this patent is extended or adjusted under 35 U.S.C. 154(b) by 195 days.

(21) Appl. No.: 16/021,240

(22) Filed: Jun. 28, 2018

(65) Prior Publication Data

US 2019/0303559 A1    Oct. 3, 2019

Related U.S. Application Data

(60) Provisional application No. 62/648,854, filed on Mar. 27, 2018.

(51) Int. Cl.
*H04L 29/06* (2006.01)
*H04L 9/32* (2006.01)
(Continued)

(52) U.S. Cl.
CPC ............ *H04L 63/083* (2013.01); *G06F 16/27* (2019.01); *G06F 21/31* (2013.01); *G06F 21/45* (2013.01); *G06F 21/604* (2013.01); *G06Q 10/105* (2013.01); *H04L 9/0819* (2013.01); *H04L 9/0891* (2013.01); *H04L 9/3213* (2013.01);
(Continued)

(58) Field of Classification Search
CPC .................................................. H04L 63/083
See application file for complete search history.

(56) References Cited

U.S. PATENT DOCUMENTS 6,662,299 B1   12/2003   Price, III
7,437,755 B2   10/2008   Farino
(Continued)

FOREIGN PATENT DOCUMENTS

CA    2606326    11/2006
DE    19882328    5/2014
(Continued)

OTHER PUBLICATIONS

Ori Jacobovitz. "Blockchain for identity management." The Lynne and William Frankel Center for Computer Science Department of Computer Science. Dec. 2016 (Dec. 2016) Retrieved on May 27, 2019 from https://www.cs.bgu.ac.il/~frankel/TechnicalReports/2016/16-02.pdf.

*Primary Examiner* — Simon P Kanaan
(74) *Attorney, Agent, or Firm* — Van Pelt, Yi & James LLP

(57) ABSTRACT

A system for providing an application includes an interface and a processor. The interface is configured to receive an indication to provide an application to a device. The processor is configured to provide the application to the device. The application is configured to receive a request for credentialed information associated with a user from a requesting server; determine whether a stored credential satisfies the request for the credentialed information; and in response to a determination that the stored credential satisfies the request for the credentialed information: determine a response credential for responding to the request; determine that the user approves sharing the credentialed information indicated by the response credential; and provide the response credential to the requesting server.

23 Claims, 15 Drawing Sheets

(51) Int. Cl.
  *G06F 21/45* (2013.01)
  *G06F 21/31* (2013.01)
  *G06F 16/27* (2019.01)
  *G06F 21/60* (2013.01)
  *G06Q 10/10* (2012.01)
  *H04L 9/08* (2006.01)
  *G06F 21/62* (2013.01)

(52) U.S. Cl.
  CPC .......... *H04L 9/3226* (2013.01); *H04L 9/3247* (2013.01); *H04L 63/0428* (2013.01); *G06F 21/6245* (2013.01)

(56) References Cited

U.S. PATENT DOCUMENTS

| | | | |
|---|---|---|---|
| 7,735,120 B2 | 6/2010 | Wallace | |
| 8,719,952 B1 | 5/2014 | Damm-Goossens | |
| 9,419,968 B1 | 8/2016 | Pei | |
| 9,485,096 B2 | 11/2016 | Shrivastava | |
| 9,490,984 B2 | 11/2016 | Leicher | |
| 9,672,538 B1 | 6/2017 | Vaynblat | |
| 9,749,140 B2 | 8/2017 | Oberhauser | |
| 10,460,313 B1 * | 10/2019 | Clark | G06Q 20/322 |
| 2002/0176583 A1 | 11/2002 | Buttiker | |
| 2004/0177276 A1 | 9/2004 | Mackinnon | |
| 2006/0200856 A1 | 9/2006 | Salowey | |
| 2008/0148373 A1 | 6/2008 | Adams | |
| 2008/0301553 A1 | 12/2008 | Basu | |
| 2009/0119756 A1 | 5/2009 | Acuna | |
| 2011/0113484 A1 | 5/2011 | Zeuthen | |
| 2012/0079570 A1 | 3/2012 | Fu | |
| 2013/0030989 A1 | 1/2013 | Geller | |
| 2013/0125231 A1 | 5/2013 | Kuenzi | |
| 2014/0079221 A1 | 3/2014 | McCallum | |
| 2014/0181927 A1 | 6/2014 | Sarkissian | |
| 2014/0187149 A1 | 7/2014 | Lortz | |
| 2014/0222682 A1 | 8/2014 | Dua | |
| 2014/0281525 A1 | 9/2014 | Acar | |
| 2015/0089244 A1 | 3/2015 | Roth | |
| 2015/0278824 A1 | 10/2015 | Zabar | |
| 2016/0149896 A1 | 5/2016 | Sarkissian | |
| 2016/0162896 A1 | 6/2016 | Grigg | |
| 2017/0005804 A1 | 1/2017 | Zinder | |
| 2017/0005809 A1 | 1/2017 | Adam | |
| 2017/0012784 A1 | 1/2017 | Cross | |
| 2017/0041151 A1 | 2/2017 | Kommireddy | |
| 2017/0109759 A1 | 4/2017 | Korb | |
| 2017/0155686 A1 | 6/2017 | Yanacek | |
| 2017/0222814 A1 | 8/2017 | Oberhauser | |
| 2017/0277773 A1 | 9/2017 | Iasi | |
| 2017/0317997 A1 | 11/2017 | Smith | |
| 2018/0075247 A1 | 3/2018 | Campero | |
| 2018/0124041 A1 | 5/2018 | Bhalerao | |
| 2018/0159839 A1 | 6/2018 | Citron | |
| 2018/0248859 A1 * | 8/2018 | Zudic | G06F 21/45 |
| 2019/0036710 A1 | 1/2019 | Qiu | |

FOREIGN PATENT DOCUMENTS

| | | |
|---|---|---|
| WO | 2010083522 | 7/2010 |
| WO | 2017085546 | 5/2017 |
| WO | 2017127564 | 7/2017 |

\* cited by examiner

SHARING CREDENTIALS

CROSS REFERENCE TO OTHER APPLICATIONS

This application claims priority to U.S. Provisional Patent Application No. 62/648,854 entitled SYSTEM FOR ISSUANCE, VERIFICATION, AND REVOCATION OF CREDENTIALS filed Mar. 27, 2018 which is incorporated herein by reference for all purposes.

BACKGROUND OF THE INVENTION

Modern users of database systems (e.g., human resources database systems or financial database systems) rely on the database systems for access to their personal information or verification information (e.g., salary, tax details, employment status, etc. or university degree, certifications, criminal record, ownership, etc.). Users trust the database systems to contain correct information. When a user desires to provide personal information or verification information from the database system to another database system (e.g., providing previous employment or salary information to a potential employer, providing previous insurance information to a potential employer, etc.), the user typically accesses the information on the database system and then provides the information manually to the other database system (e.g., by inputting data into an electronic form or uploading digital paperwork). The user trusts the information it receives from the database system, however the other database system cannot have the same level of trust in the information it receives from the user. There is a problem in that it is difficult to trust data as it passes from system to system via a human.

BRIEF DESCRIPTION OF THE DRAWINGS

Various embodiments of the invention are disclosed in the following detailed description and the accompanying drawings.

DETAILED DESCRIPTION

Figure 1:
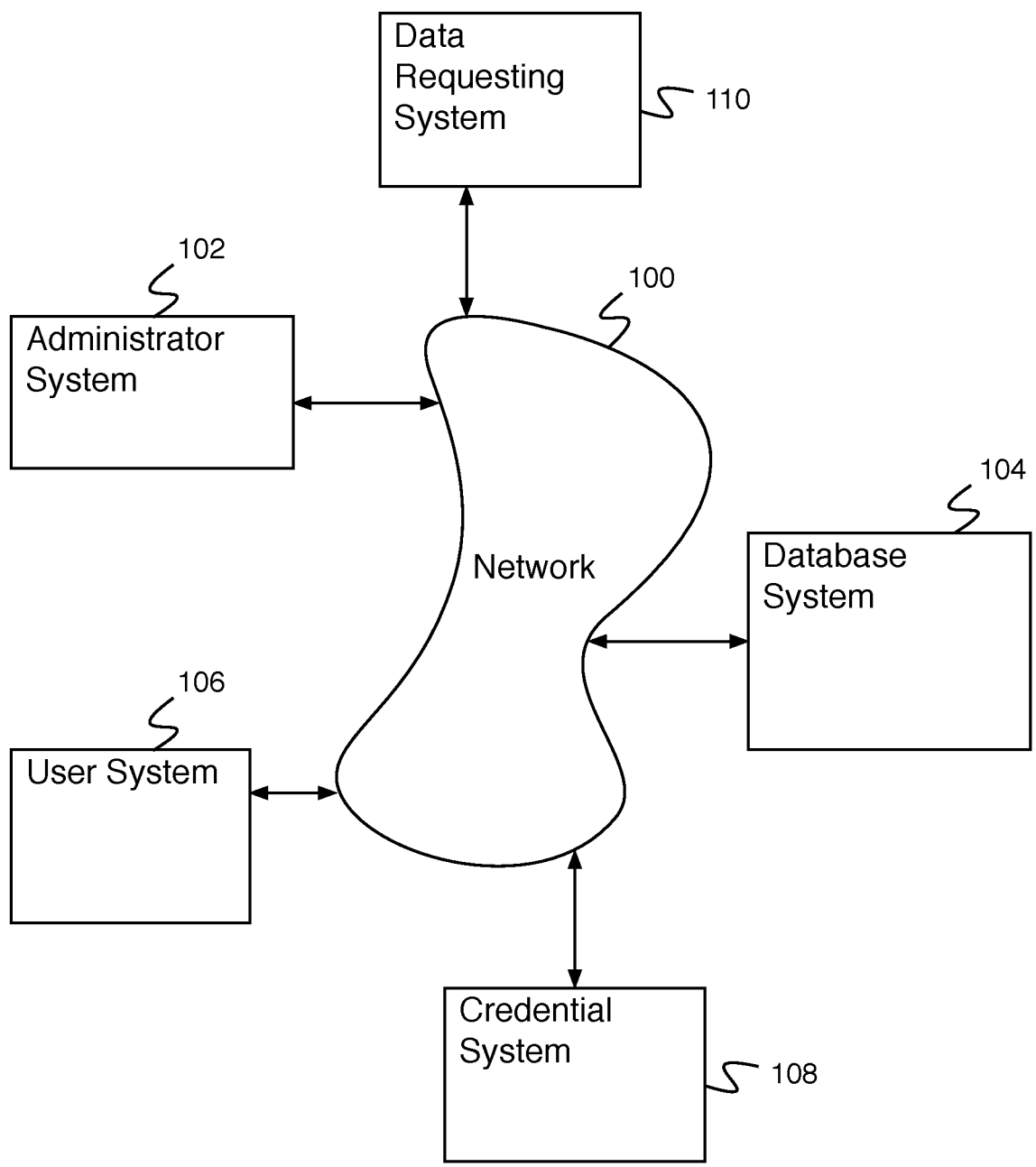
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for providing an application comprises an interface configured to receive an indication to provide an application to a device, and a processor configured to provide the application to the device. The application is configured to receive a request for credentialed information associated with a user from a requesting server, determine whether a stored credential satisfies the request for credentialed information, and in response to a determination that a stored credential satisfies the request for credentialed information: determine a response credential for responding to the request, determine that the user approves sharing the information indicated by the response credential, and provide the response credential to the requesting server.

A system for sharing credential information comprises an interface configured to receive a request for credentialed information associated with a user from a requesting server, and a processor configured to determine whether a stored credential satisfies the request for credentialed information. The processor is additionally configured to, in response to a determination that a stored credential satisfies the request for credentialed information: determine a response credential for responding to the request, determine that the user approves sharing the information indicated by the response credential, and provide the response credential to a credential verifier.

A system for sharing credentials comprises a system for a user system (e.g., a computing system for use by a user) interacting with a database system. The database system further interacts with a credential issuing system. The database system stores user information for the user. The database system further determines a set of credentials available to the user based on the user information as well as record of previously issued credentials. The credentials comprise categories satisfied by the user information at differing levels of specificity. For example, in the case where the user comprises an employee earning $95,000 per year, the database system could determine credentials available to the user indicating that the user earns more than $60,000 per year, that the user earns more than $80,000 per year, that the user earns in the range of $90,000-$100,000 per year, etc. When the user interacts with the database system using a credential requesting app or application, the database system determines the set of credentials available to the user and provides the list of credentials to the credential requesting app. The user can then request that one or more available credentials be downloaded to local storage using the credential requesting app.

When a user indicates to download a credential, a credential request is created on the user system and provided to the database system. The database system determines whether the credential is valid for the user, and in the event the credential is valid for the user, the database system requests the credential from the credential server. The credential server generates the credential and provides it to the database system. The credential server generates the credential in such a way that its validity is publicly verifiable (e.g., cryptographic keys used for verification can be found in a public or semi-public distributed ledger). The database system determines privacy information associated with the credential (e.g., a description of the personal information or verification information of the user indicated by the credential) and provides the credential and privacy information to the user system. The user system receives and stores the credential and privacy information.

When the user interacts with another system requesting personal information, a stored credential can be used to provide proof of the requested information. The requesting system issues a request including a description of the personal information or verification information requested (for example, a salary history, an employment history, a verification of health insurance coverage, etc. or university degree, certifications, criminal record, ownership, etc.). The user system receives the request and determines whether a stored credential comprises proof of the requested information. In the event multiple credentials comprise proof of the requested information, a determination of which credential to use as a response can be made manually (e.g., by prompting the user to indicate which credential to use) or automatically (e.g., by determining which credential of the multiple credentials that comprise proof of the requested information indicates the least amount of private information). The user is then provided a privacy description of the credential, indicating the private information the user is sharing by submitting the credential, and prompted to approve sharing the information. Once the user approves sharing the information, the credential is provided to the requesting system. In some embodiments, the approval comprises locally authenticating to the user system, either via a biometric or knowledge based authentication.

The requesting system verifies the credential by providing the credential to a credential verification system, and in the event the requesting system receives an indication that the credential comprises a valid response to the request for personal information, the requesting system stores an indication that the user response has been proven. The requesting system additionally provides an indication to the user system that the user response has been proven. The user system stores an indication that the credential was provided to the requesting system and that it was accepted.

By enabling the transfer of personal information or verification information between disparate database systems using verifiable credentials, this system allows that transfer of information with a level of trust and security not previously accomplished. This allows the reduction or elimination of problems such as data theft during information transfer and misrepresentation of personal information. Allowing an individual to share data in a trustworthy fashion also prevents the need to build costly system-to-system integrations AND puts individual users in control of their privacy and data.

The system is a better computer system enabling efficient secure distribution of information. For example, the system is set up to securely receive and provide information. The security protocols and the distributed ledger storage enable credentialing data and being able to act as a trusted source for the data.

In some embodiments, a technology other than a secure distributed ledger is used for securely storing public keys that enable the verifiability of data. In some embodiments, a shared accessible network accessible medium is used to distribute public keys associated with the verifiability of authenticated credentials. This shared public network could be an open model like Twitter where users tweet the public key information (keybase.io does this), or a semi-private shared database of public keys for which the participants in the credentials exchanges all have authenticated access via a set of RESTful APIs to fetch keys for credential verification.

FIG. 1 is a block diagram illustrating an embodiment of a network system. In some embodiments, the network system of FIG. 1 comprises a network system for a system for validating data. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Administrator system 102, database system 104, user system 106, credential system 108, and data requesting system 110 communicate via network 100. Administrator system 102 comprises an administrator system for use by an administrator. Administrator system 102 comprises an administrator system for executing administrator commands, for configuring database system 104, etc. Database system 104 comprises a database system for providing user access to data stored in a tenanted area of database system 104 (e.g., access to add data, view data, modify data, delete data, access reports, execute business processes, etc.). Database system 104 additionally comprises a system for providing a credential to a user. The credential comprises a digital token that may be provided to data requesting system 110 securely indicating user data.

User system 106 comprises a user system for use by a user. A user uses a user system to interact with database system 104—for example, to store database data, to request database data, to request reporting based on database data, to request a credential based on database data, etc. In some embodiments, the network system of FIG. 1 comprises a plurality of user systems associated with one or more users.

A user uses user system 106 to provide an indication to database system 104 requesting a credential (e.g., a credential based on data stored by database system 104). User system 106 receives login information associated with a user, determines credentials available to the user, and provides an indication of the credentials available to the user. User system 106 then receives an indication to add a credential (e.g., one of the credentials available to the user), creates a credential request, and provides the credential request to a server system (e.g., database system 104). User system 106 then receives and stores the credential.

Upon receiving the credential request, database system 104 verifies that the user has access to the credential (e.g., that the credential is valid for the user) and in the event that the user has access to the credential, database system 104 requests the credential from credential system 108. Database system 104 receives the credential from credential system 108 and provides it to user system 106.

Data requesting system 110 comprises a system requesting data from a user system. For example, data requesting system 110 comprises an application server system or a database server system for collecting user data. Data requesting system 110 collects user data as part of an application for employment, housing, health insurance, etc. When user system 106 receives the request for user data (e.g., a request for credentialed information associated with a user), user system 106 then determines whether a stored credential satisfies the request for credentialed information. In response to a determination that a stored credential satisfies the request for credentialed information, user system 106 is configured to determine a response credential for responding to the request, determine that the user approves sharing the information indicated by the response credential, and provide the response credential to the requesting server.

Figure 2:
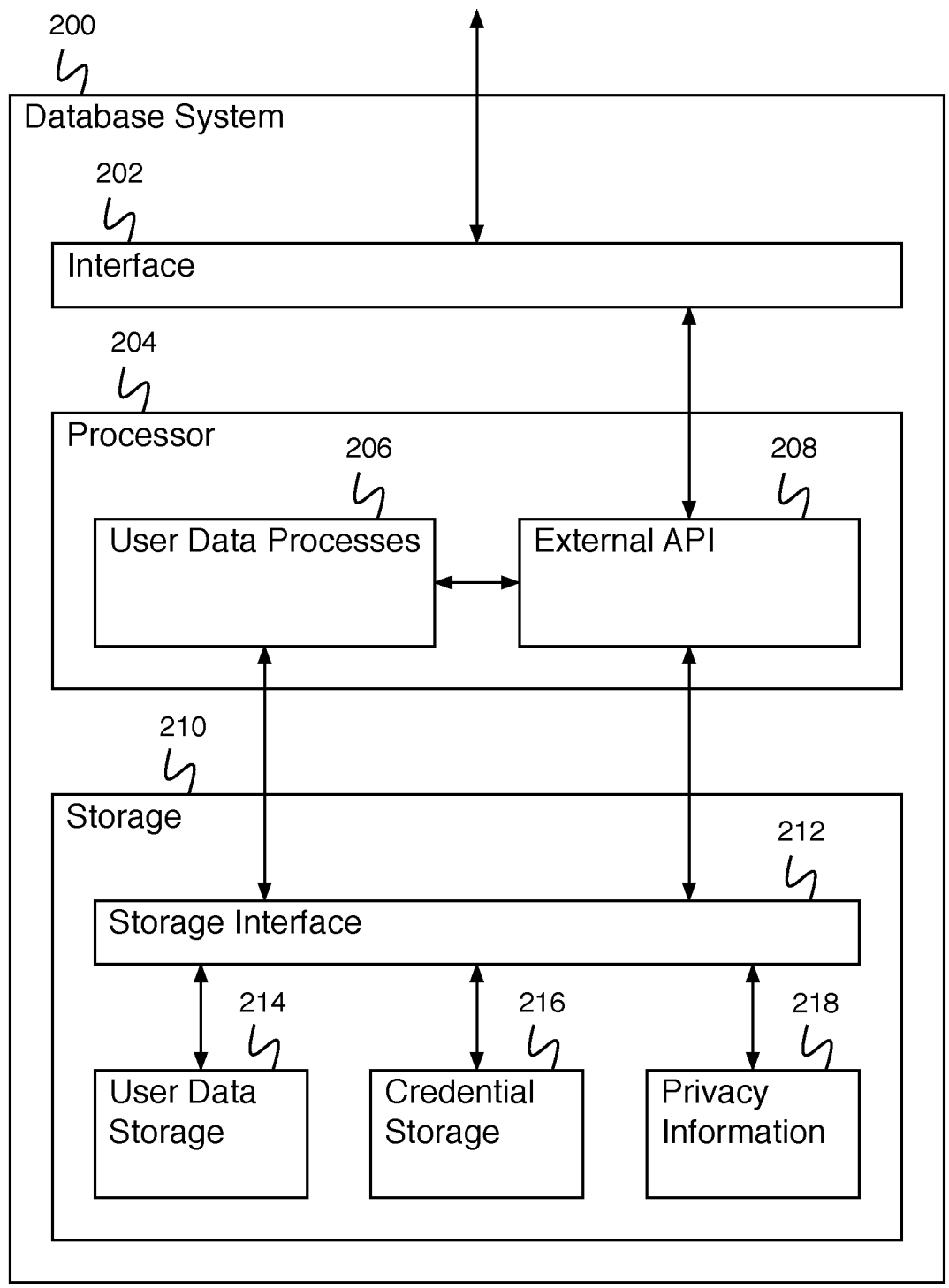
FIG. 2 is a block diagram illustrating an embodiment of a database system.

FIG. 2 is a block diagram illustrating an embodiment of a database system. In some embodiments, database system 200 comprises database system 104 of FIG. 1. In the example shown, database system 200 comprises interface 202, processor 204, and storage 210. Interface 202 comprises an interface for communicating with processor 204 and with an external network (e.g., network 100 of FIG. 1, for communication with an administrator system, a user system, a credential system, etc.). Processor 204 comprises a processor for processing data, performing computations, controlling communications, etc. Processor 204 comprises external API (e.g., application programming interface) 208 for interacting with external systems, allowing external systems to request processor 204 perform actions, etc. User data processes 206 comprises a set of processes for manipulating (e.g., reading, writing, modifying, deleting, etc.) user data (e.g., user data stored in user data storage 214) and credentials (e.g., credentials stored in credential storage 216). User data processes 206 and external API 208 communicate with data stored in storage 210 via storage interface 212. User data storage 214 comprises user data describing users associated with database system 200. Credential storage 216 comprises credentials accessed by database system 200. Privacy information 218 comprises privacy information associated with credentials stored by credential storage 216.

Database system 200 receives a request for a credential associated with a user (e.g., a user for the credential) and associated with a credential identifier (e.g., a credential identifier identifying the requested credential). Database system 200 then determines that the credential identifier is valid for the user (e.g., that the user is entitled to the indicated credential), determines privacy information associated with the requested credential, and provides the credential request to a credential server. Database system 200 receives the credential from the credential server and provides the credential, the privacy information, and the credential identifier (e.g., to the requesting user system).

Figure 3:
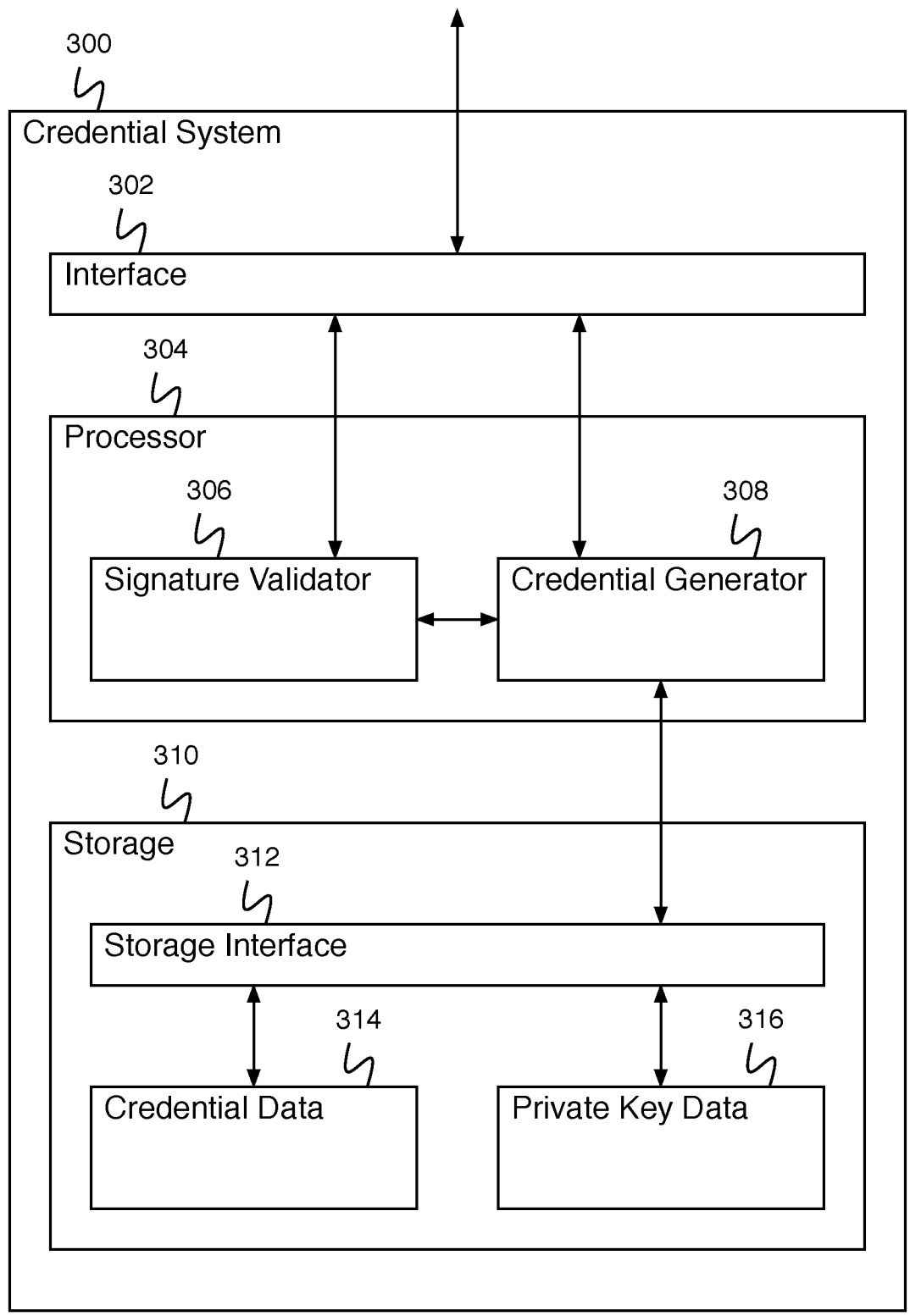
FIG. 3 is a block diagram illustrating an embodiment of a credential system.

FIG. 3 is a block diagram illustrating an embodiment of a credential system. In some embodiments, credential system 300 comprises credential system 108 of FIG. 1. In the example shown, credential system 300 comprises interface 302, processor 304, and storage 310. Interface 302 comprises an interface for communicating with processor 304 and with an external network (e.g., network 100 of FIG. 1, for communication with an administrator system, a user system, a database system, etc.). Processor 304 comprises a processor for processing data, performing computations, controlling communications, etc. Processor 304 comprises signature validator 306 and credential generator 308. Signature validator 306 comprises a signature validator for validating a digital signature (e.g., a signature received as part of a credential request). Credential generator 308 comprises a credential generator for generating a credential (e.g., a credential generator for generating a credential based at least in part on a private key, a credential generator for cryptographically generating a credential, etc.). Credential generator 308 interacts with credential data 314 and private key data 316 of storage 310 via storage interface 312.

Figure 4:
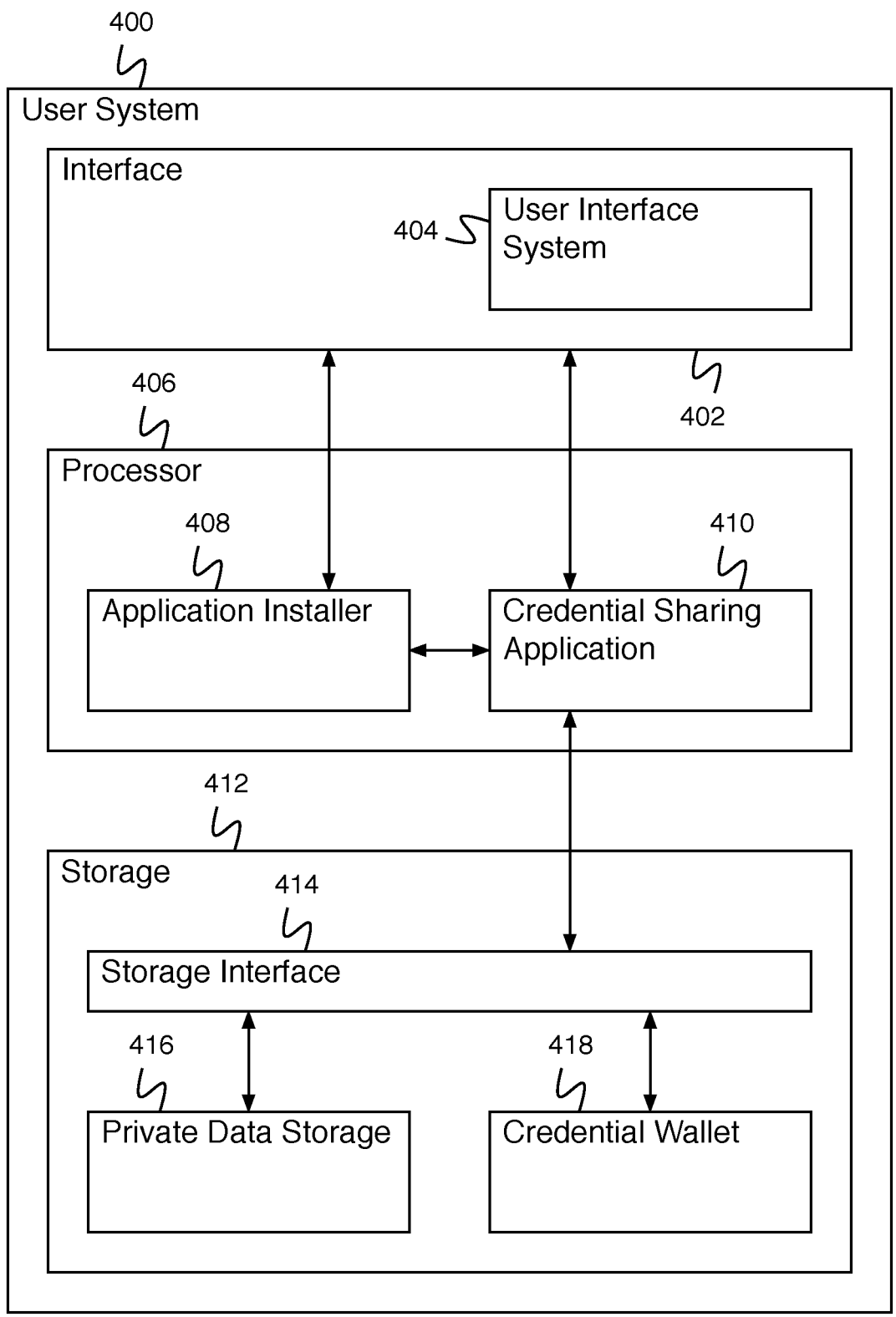
FIG. 4 is a block diagram illustrating an embodiment of a user system.

FIG. 4 is a block diagram illustrating an embodiment of a user system. In some embodiments, user system 400 of FIG. 4 comprises user system 106 of FIG. 1. In various embodiments, user system 400 comprises a personal computer, a mobile device, a tablet computer, etc. In the example shown, user system 400 comprises interface 402, processor 406, and storage 412. Interface 402 comprises an interface for communicating with processor 406 and with an external network (e.g., network 100 of FIG. 1, for communication with an administrator system, a database system, a credential system, etc.). Interface 402 additionally comprises user interface system for providing a user interface for interacting with a user. Processor 406 comprises a processor for processing data, performing computations, controlling communications, etc. Processor 406 comprises application installer 408 and credential sharing application 410. Application installer 408 comprises an application installer for receiving an application from an external server and installing the application on user system 400. For example, credential sharing application 410 is installed by application installer 408. Any other appropriate applications are additionally installed by application installer 408. Credential sharing application 410 comprises an application for interacting with a database system to share a credential. Credential sharing application 410 interacts with private data storage 416 and credential wallet 418 of storage 412 via storage interface 414.

Credential sharing application 410 is configured to receive a request for credentialed information associated with a user from a requesting server and determine whether a stored credential (e.g., a stored credential stored in credential wallet 418) satisfies the request for credentialed information. In response to a determination that a stored credential satisfies the request for credentialed information, credential sharing application 410 is configured to determine a response credential (e.g., a response credential of a set of credentials that satisfy the request for credentialed information) for responding to the request, determine that the user approves sharing the information indicated by the response credential (e.g., by prompting the user for their approval), and provide the response credential to the requesting server.

Figure 5A:
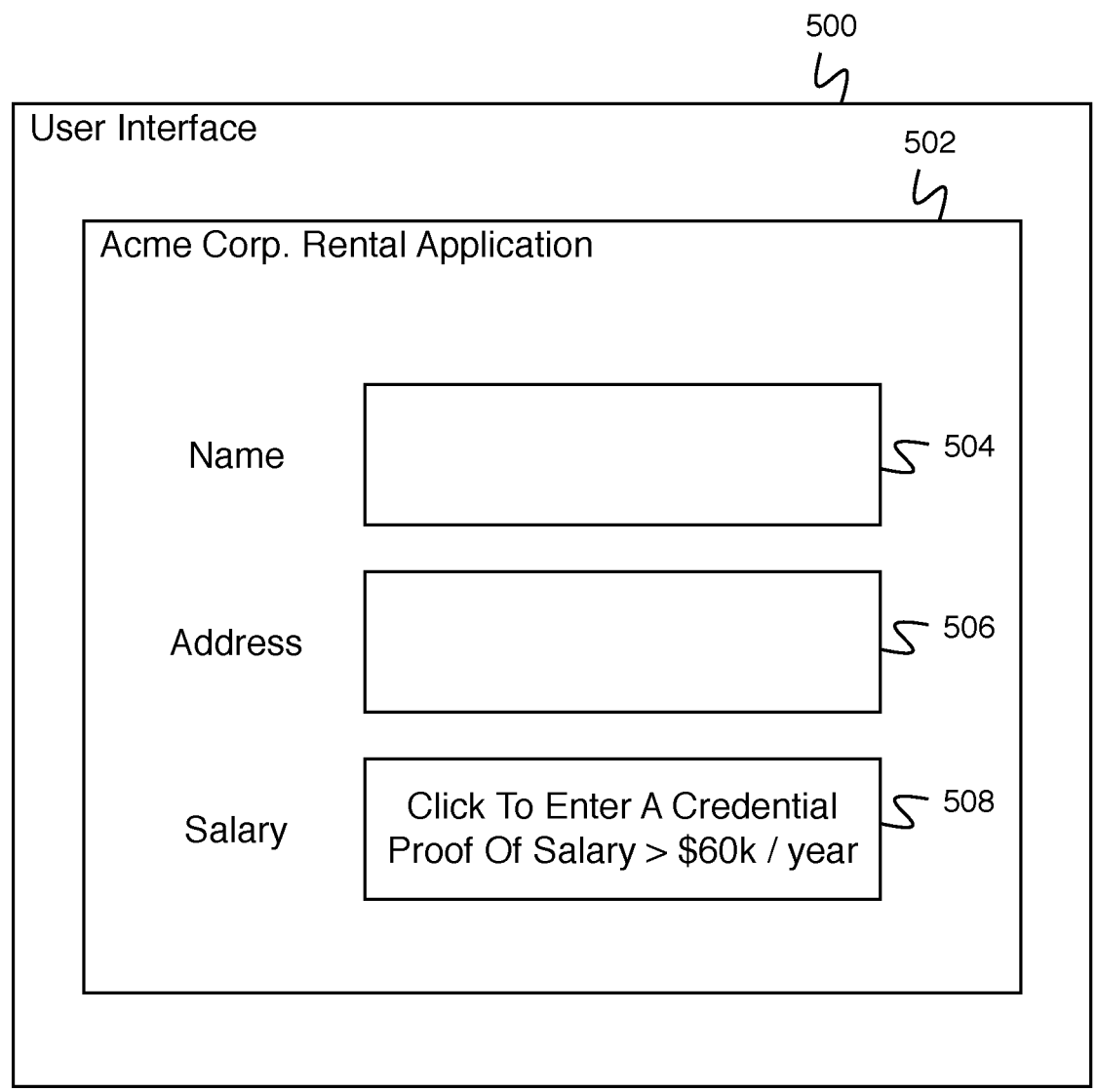
FIG. 5A is a diagram illustrating an embodiment of a user interface for a user system.

FIG. 5A is a diagram illustrating an embodiment of a user interface for a user system. In some embodiments, the user interface of FIG. 5A comprises a request for information provided by a data requesting system (e.g., data requesting system 110 of FIG. 1). In the example shown, user interface 500 displays Acme Corp. Rental Application 502 (e.g., a housing rental application provided by a fictional Acme Corp.). Acme Corp. Rental Application 502 comprises a rental application comprising a set of data fields for a prospective renter to fill out. Acme Corp. Rental Application 502 comprises name field 504, address field 506, and salary field 508. In the example shown, name field 504 and address field 506 comprise text fields for a user to enter text. Salary field 508 comprises a field for entering a credential—for example, as proof that the user meets the salary requirement of a salary greater than $60,000 per year. In the example shown, salary field 508 prompts a user to click to start a process for entering a credential. For example, when the user clicks on salary field 508 the data requesting system provides a request for credentialed information (e.g., a push notification), or when the user clicks on salary field 508 the data requesting system provides a digital identifier (e.g., a universal resource locator (URL), a bar code, a QR code, etc.) enabling the user to begin the process for entering a credential on the user system or on a different user system (e.g., by entering the URL or taking a digital photo of the bar code or QR code) or automatically beginning the process for retrieving a credential (e.g., in response to a push notification).

Figure 5B:
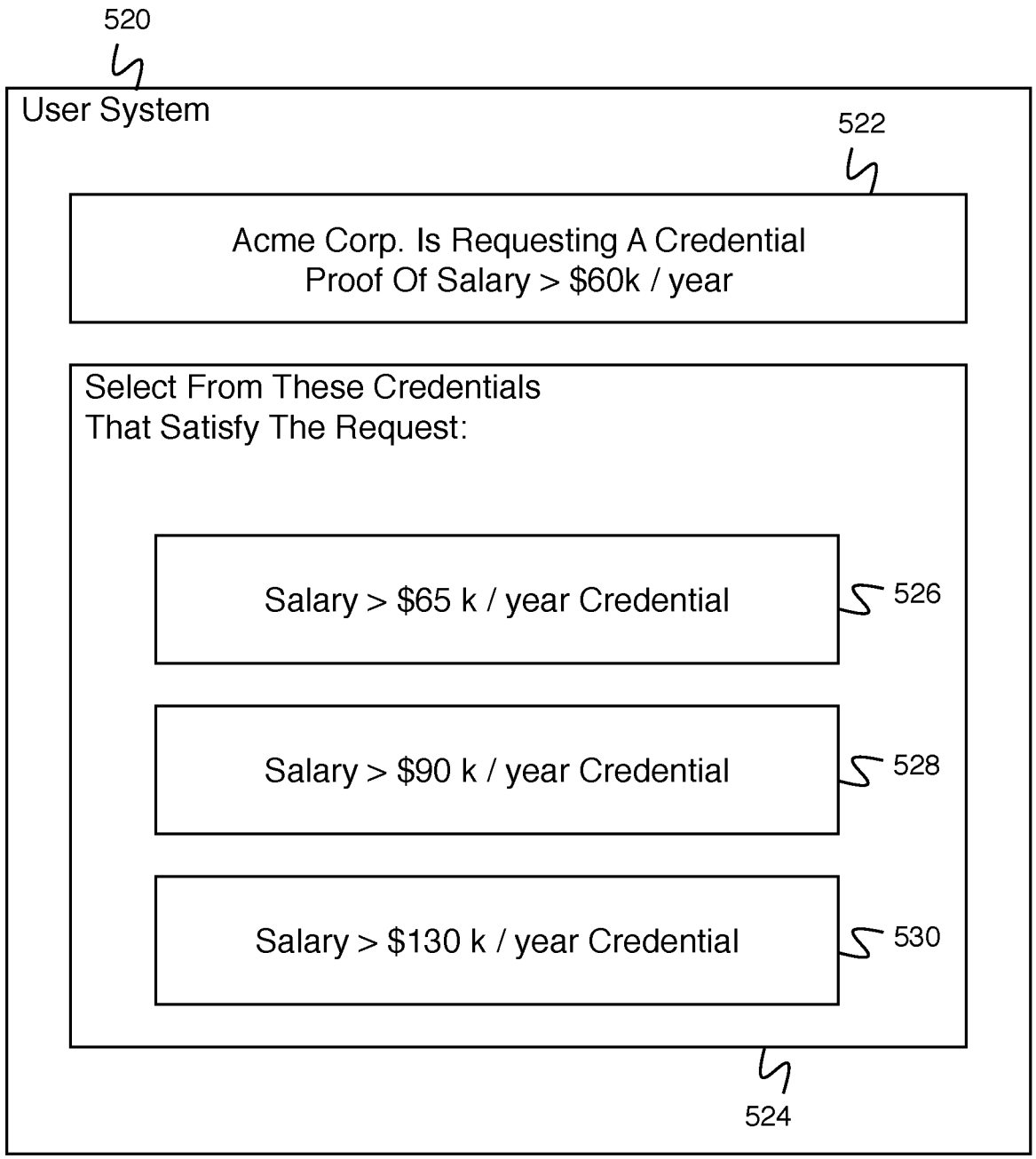
FIG. 5B is a diagram illustrating an embodiment of a user interface for a user system.

FIG. 5B is a diagram illustrating an embodiment of a user interface for a user system. In some embodiments, the user interface of FIG. 5B comprises a user interface provided by user interface system 404 of FIG. 4. In the example shown, user system 520 displays header 522 indicating that Acme Corp. is requesting a credential from the user system comprising a proof of salary greater than $60,000 per year. User system 520 additionally displays credential selection window 524 for a user to select a credential. Credential selection window 524 displays user interface elements for selecting from credentials. In the example shown, salary greater than $65,000 per year credential button indicates a selection of a credential indicating a salary greater than $65,000 per year, salary greater than $90,000 per year credential button indicates a selection of a credential indicating a salary greater than $90,000 per year, and salary greater than $130,000 per year credential button indicates a selection of a credential indicating a salary greater than $130,000 per year. When a user selects a button the corresponding credential is supplied in response to the credential request. In some embodiments, a credential for responding to the credential request is determined automatically rather than prompting a user. For example, the credential that indicates the least amount of private information is automatically selected. In the example shown, the credential indicating a salary greater than $65,000 per year comprises the credential that indicates the least amount of private information.

Figure 5C:
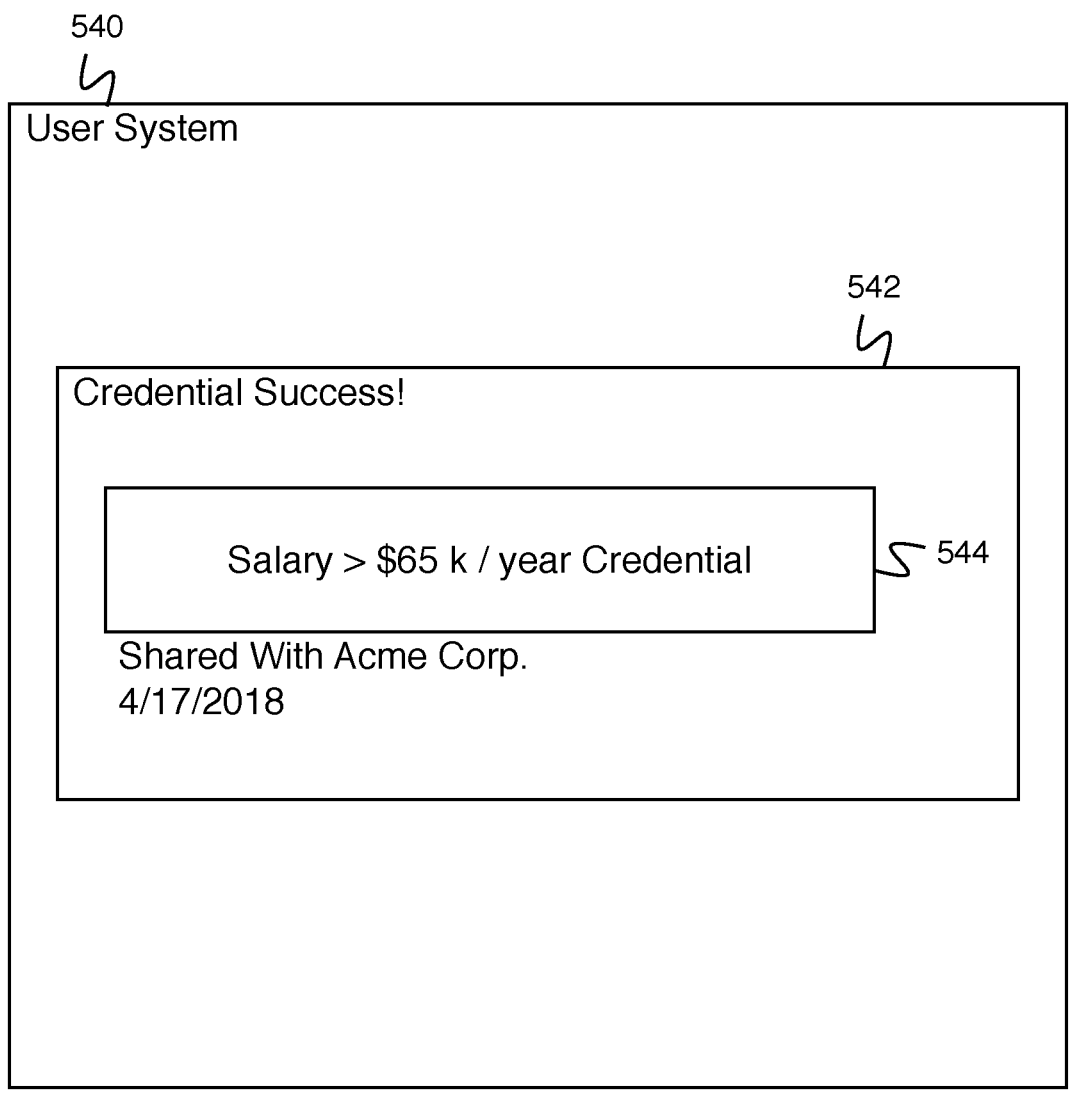
FIG. 5C is a diagram illustrating an embodiment of a user interface for a user system.

FIG. 5C is a diagram illustrating an embodiment of a user interface for a user system. In some embodiments, the user interface of FIG. 5C comprises a user interface provided by user interface system 404 of FIG. 4. In the example shown, user system 540 displays credential success window 542. Credential success window 542 indicates that a selected credential was successfully submitted to and accepted by a credential requesting server. In the example shown, credential success window 542 comprises credential box 544 indicating that a credential indicating a salary greater than $65,000 per year was successfully submitted and accepted by the credential requesting server. Credential success window 542 additionally displays text indicating that the credential was shared with Acme Corp. on Apr. 17, 2018.

Figure 5D:
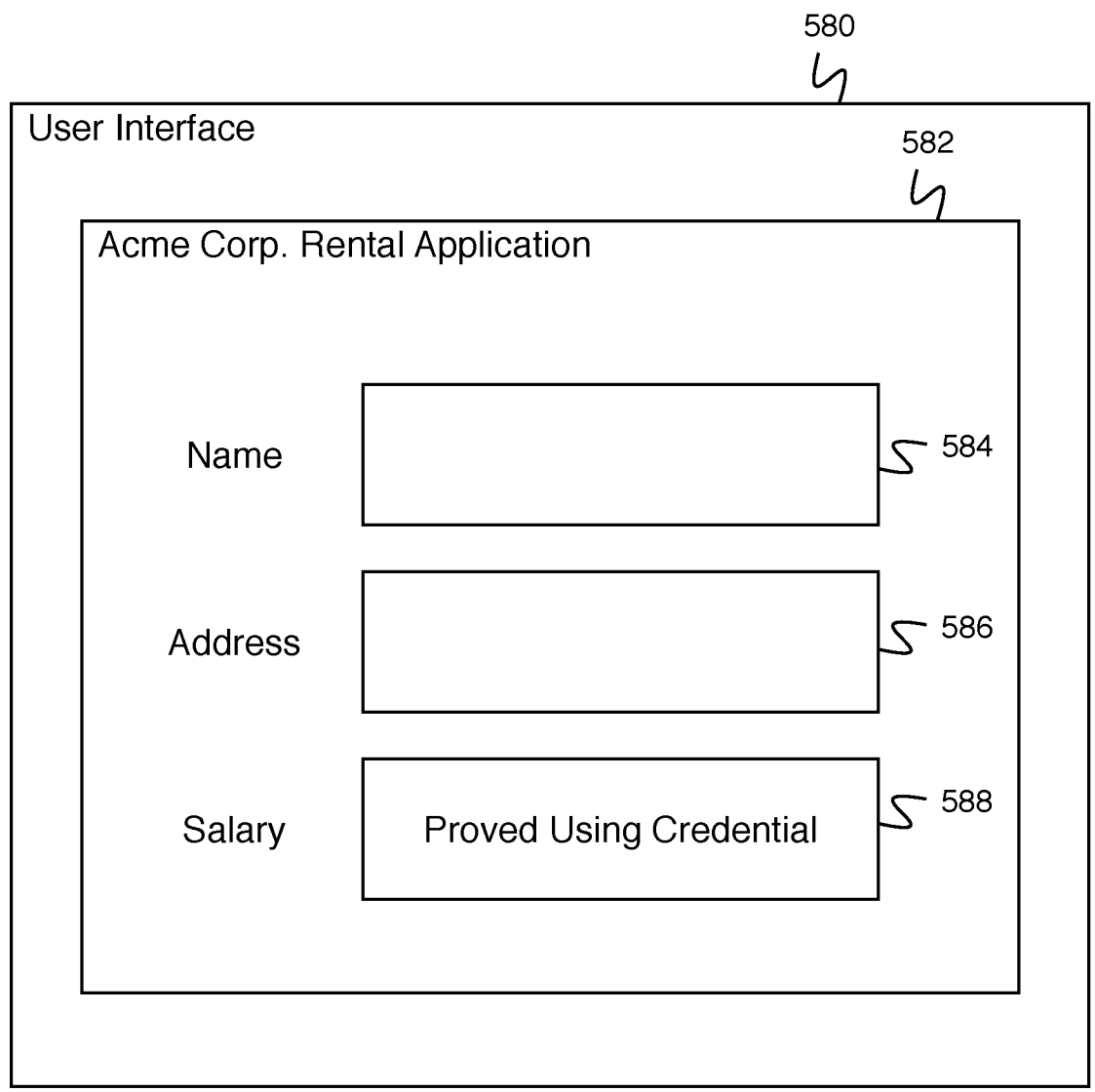
FIG. 5D is a diagram illustrating an embodiment of a user interface for a user system.

FIG. 5D is a diagram illustrating an embodiment of a user interface for a user system. In some embodiments, user interface 580 of FIG. 5D comprises user interface 500 of FIG. 5A after the successful completion of a process for sharing credential information. In the example shown, user interface 580 displays Acme Corp. Rental Application 582 (e.g., a housing rental application provided by a fictional Acme Corp.). Acme Corp. Rental Application 582 comprises a rental application comprising a set of data fields for a prospective renter to fill out. Acme Corp. Rental Application 582 comprises name field 584, address field 586, and salary field 588. In the example shown, name field 584 and address field 586 comprise text fields for a user to enter text. Salary field 588 indicates that the data requested has been satisfactorily proved using a credential.

Figure 6:
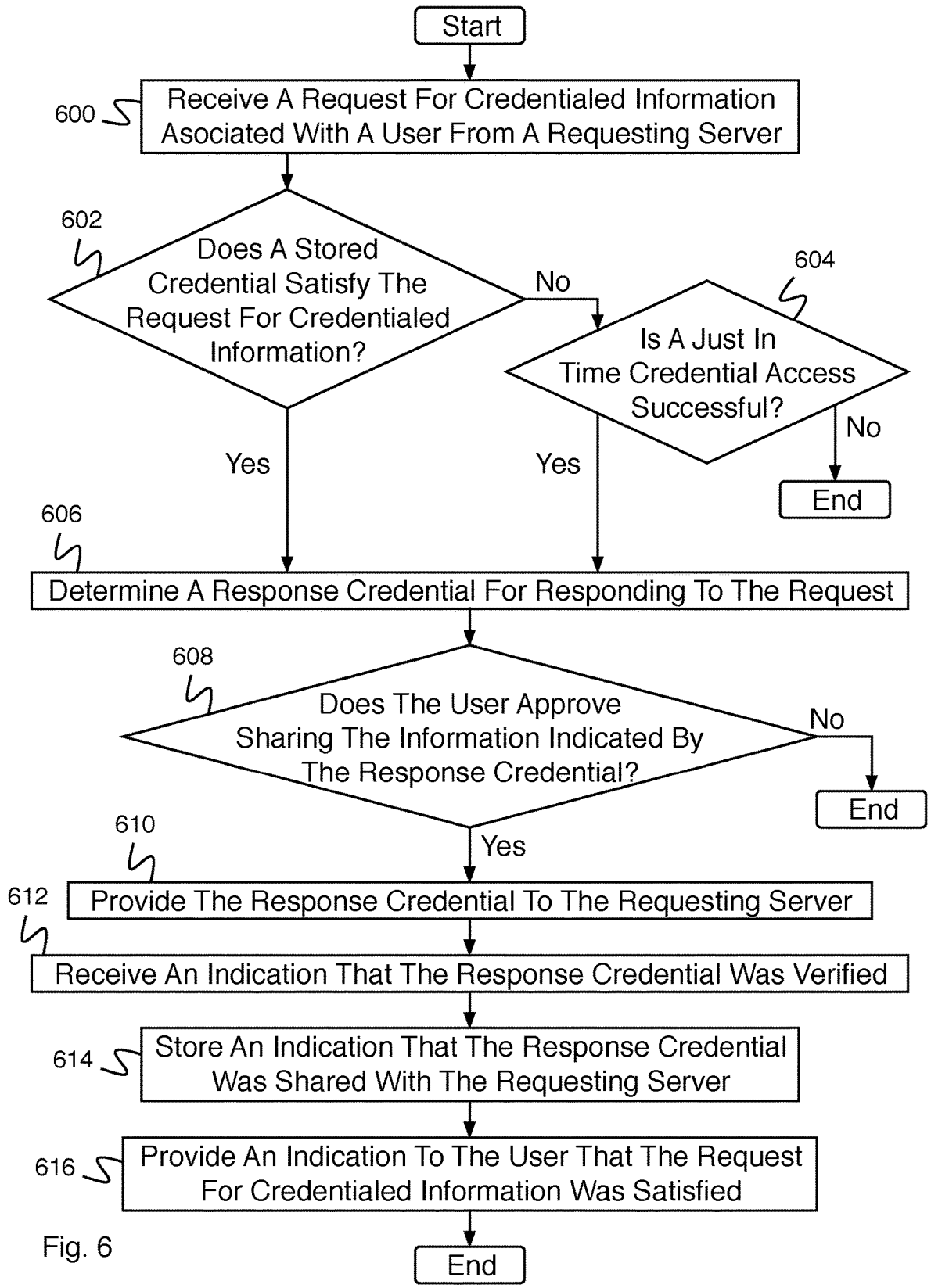
FIG. 6 is a flow diagram illustrating an embodiment of a process for sharing credential information.

FIG. 6 is a flow diagram illustrating an embodiment of a process for sharing credential information. In some embodiments, the process of FIG. 6 is executed by a user system (e.g., user system 106 of FIG. 1). In the example shown, in 600, a request for credentialed information associated with a user is received from a requesting server. In 602, it is determined whether a stored credential satisfies the request for credentialed information. In the event it is determined that a stored credential satisfies the request for credentialed information, control passes to 606. In the event it is determined that a stored credential does not satisfy the request for credentialed information, control passes to 604. In 604, it is determined whether a just in time credential access is successful. For example, a credential satisfying a request is available from a server for downloading and subsequently for being provided in a near real time manner or 'just in time' to satisfy the request. In the event it is determined that a just in time credential access is not successful, the process ends. In the event it is determined that a just in time credential access is successful, control passes to 606. In 606, a response credential for responding to the request is determined. In 608, it is determined whether the user approves sharing the information indicated by the response credential. In the event it is determined that the user does not approve sharing the information indicated by the response credential, the process ends. In the event it is determined that the user approves sharing the information indicated by the response credential, control passes to 610. In 610, the response credential is provided to the requesting server. In 612, an indication that the response credential was verified is received. In 614, an indication is stored that the response credential was shared with the requesting server. In 616, an indication is provided to the user that the request for credentialed information was satisfied.

Figure 7:
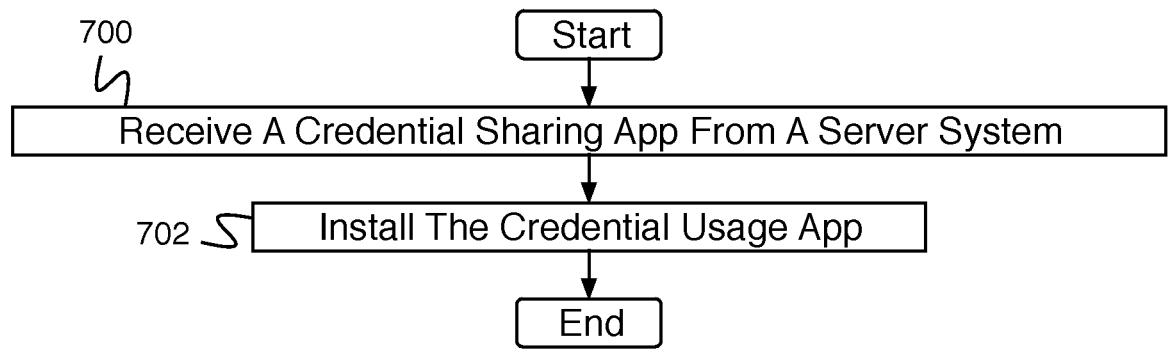
FIG. 7 is a flow diagram illustrating an embodiment of a process for installing an app.

FIG. 7 is a flow diagram illustrating an embodiment of a process for installing an app. In some embodiments, the process of FIG. 7 is executed by application installer 408. In the example shown, in 700, a credential sharing app is received from a server system. In 702, the credential sharing app is installed.

Figure 8:
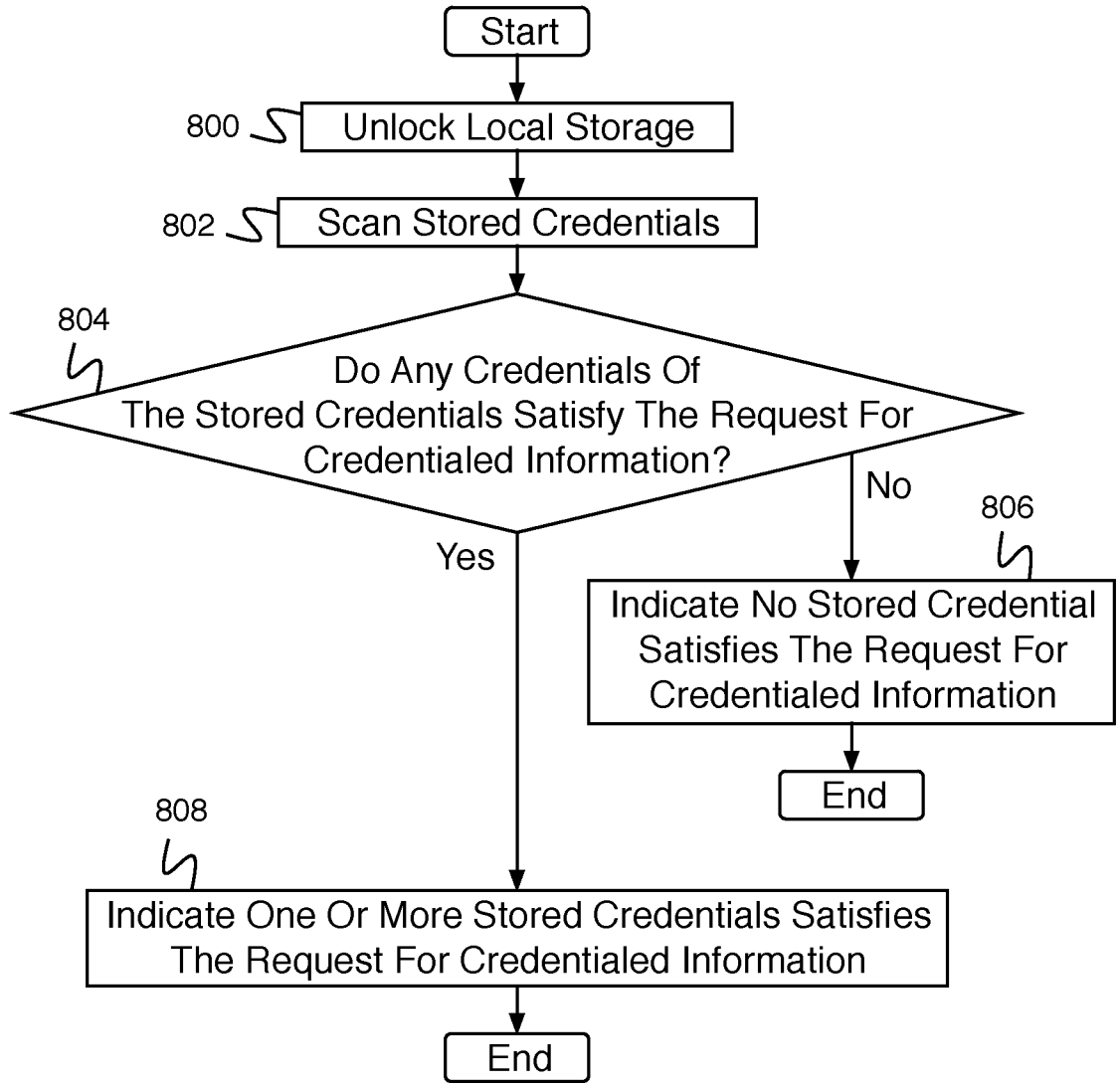
FIG. 8 is a flow diagram illustrating an embodiment of a process for determining whether a stored credential satisfies the request for credentialed information.

FIG. 8 is a flow diagram illustrating an embodiment of a process for determining whether a stored credential satisfies the request for credentialed information. In some embodiments, the process of FIG. 8 implements 602 of FIG. 6. In the example shown, in 800, local storage is unlocked. In 802, stored credentials are scanned. In 804, it is determined whether any credentials of the stored credentials satisfy the request for credentialed information. In the event it is determined that no credentials of the stored credentials satisfy the request for credentialed information, control passes to 806. In 806, the process indicates that not stored credential satisfies the request for credentialed information, and the process ends. In the event it is determined in 804 that any credentials of the stored credentials satisfy the request for credentialed information, control passes to 808. In 808, the process indicates one or more stored credentials satisfies the request for credentialed information.

Figure 9:
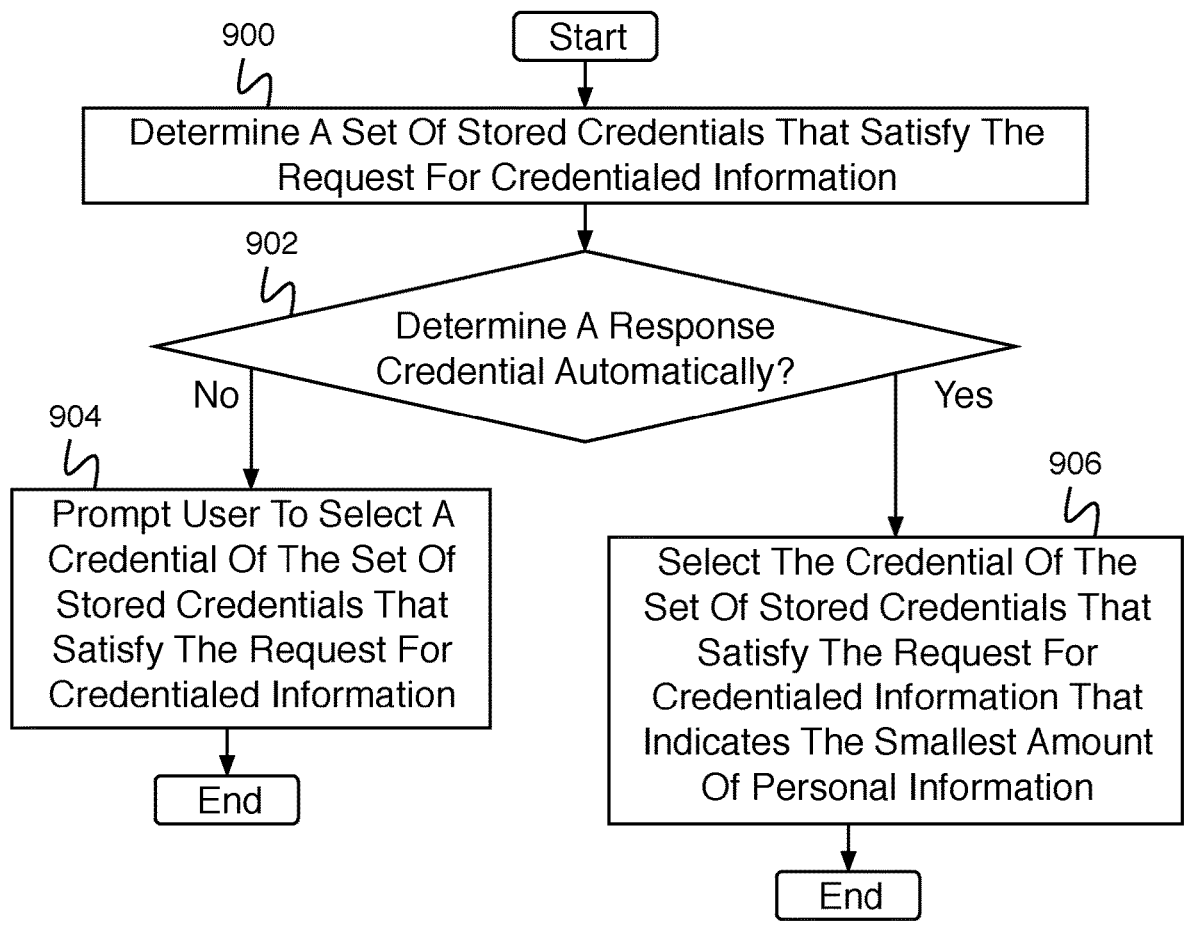
FIG. 9 is a flow diagram illustrating an embodiment of a process for determining a response credential for responding to a request for credentialed information.

FIG. 9 is a flow diagram illustrating an embodiment of a process for determining a response credential for responding to a request for credentialed information. In some embodiments, the process of FIG. 9 implements 606 of FIG. 6. In the example shown, in 900, a set of stored credentials that satisfy the request for credentialed information is determined. In 902, it is determined whether to determine a response credential automatically. In various embodiments, it is determined whether to determine a response credential automatically based at least in part on a system setting, an administrator setting, a user prompt, a previous determination, or it is determined whether to determine a response credential automatically in any other appropriate way. In the event it is determined not to determine a response credential automatically, control passes to 904. In 904, a user is prompted to select a credential of the set of stored credentials that satisfy the request for credentialed information, and the process ends. In the event it is determined in 902 to determine a response credential automatically, control passes to 906. In 906, the credential of the set of stored credentials that satisfy the request for credentialed information that indicates the smallest amount of personal information or verification information is selected.

Figure 10:
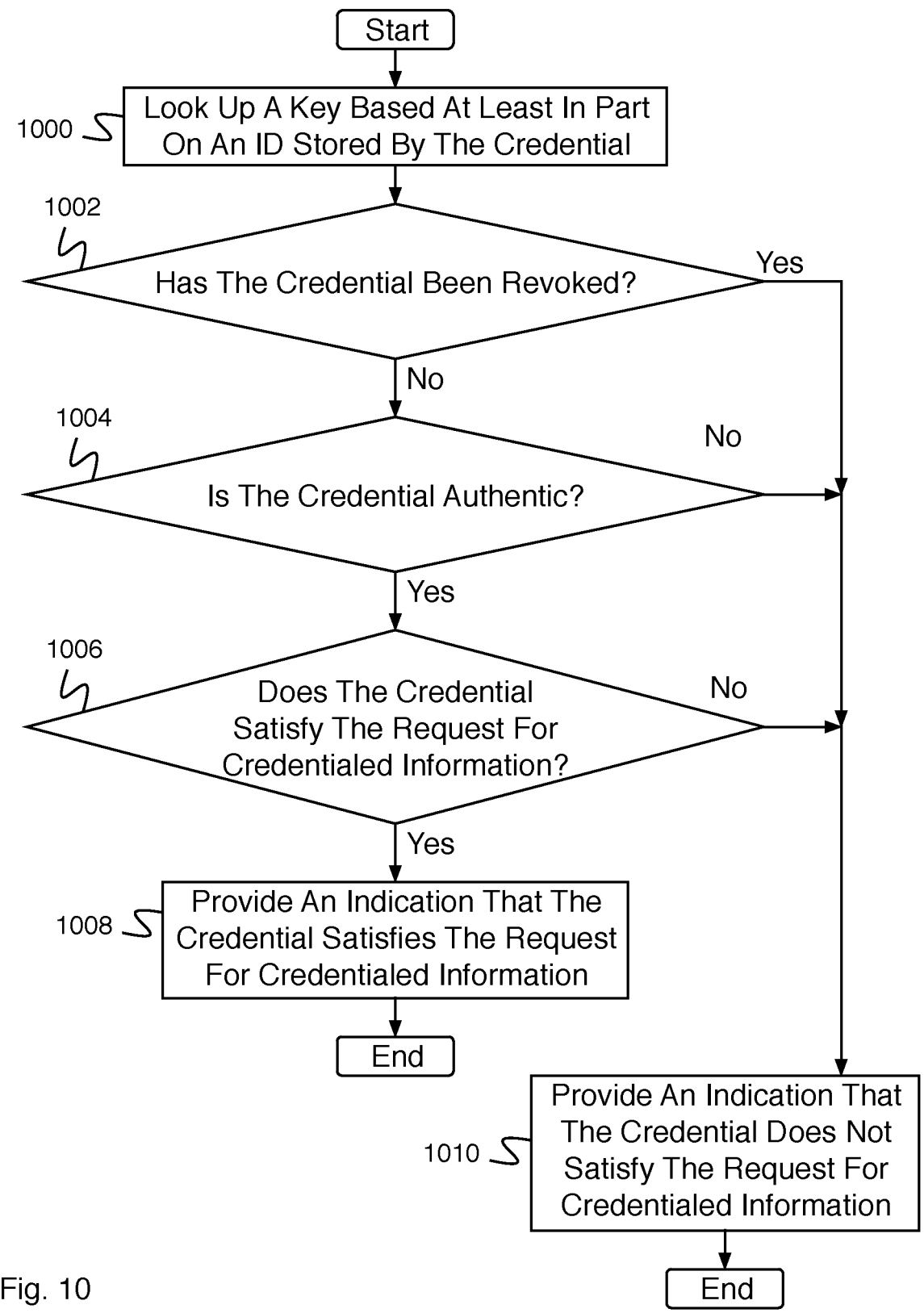
FIG. 10 is a flow diagram illustrating an embodiment of a process for verifying a credential.

FIG. 10 is a flow diagram illustrating an embodiment of a process for verifying a credential. In some embodiments, the process of FIG. 10 is executed by a data requesting system (e.g., data requesting system 110 of FIG. 1) in response to receiving a credential. In the example shown, in 1000, a key is looked up based at least in part on an identifier stored by the credential. In 1002, it is determined whether the credential has been revoked. For example, a key is looked up based at least in part on an ID stored by the credential and it is determined whether the credential has been revoked using a revocation ledger. In the event it is determined that the credential has been revoked, control passes to 1010. In the event it is determined that the credential has not been revoked, control passes to 1004. In 1004, it is determined whether the credential is authentic. In some embodiments, determining whether a credential is authentic comprises providing the credential to a credential system for determination of whether the credential is authentic. For example, the data requesting system should be able to perform step 1004 using cryptography and the key found in step 1000. In the event it is determined that the credential is not authentic, control passes to 1010. In the event it is determined that the credential is authentic, control passes to 1006. In 1006, it is determined whether the credential satisfies the request for credentialed information. In the event it is determined that the credential does not satisfy the request for credentialed information, control passes to 1010. In the event it is determined that the credential satisfies the request for credentialed information, control passes to 1008. In 1008, an indication is provided that the credential satisfies the request for credentialed information, and the process ends. In 1010, an indication is provided that the credential does not satisfy the request for credentialed information.

Figure 11:
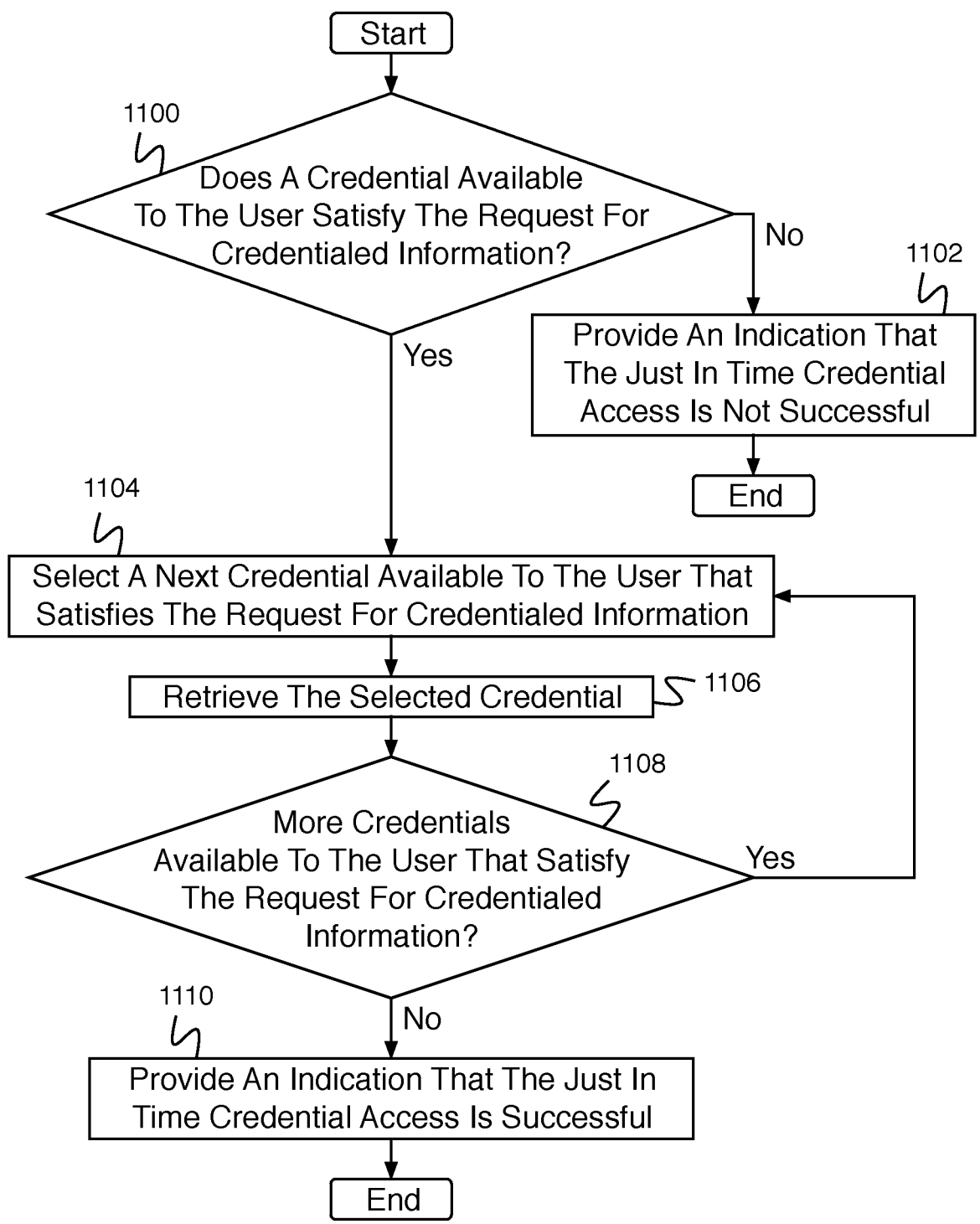
FIG. 11 is a flow diagram illustrating an embodiment of a process for determining whether a just in time credential access is successful.

FIG. 11 is a flow diagram illustrating an embodiment of a process for determining whether a just in time credential access is successful. In some embodiments, the process of FIG. 11 implements 604 of FIG. 6. In the example shown, in 1100, it is determined whether a credential available to the user satisfies the request for credentialed information. In some embodiments, determining whether a credential available to the user satisfies the request for credentialed information comprises querying a database system for a set of credentials available to the user and determining whether any of the credentials available to the user satisfy the request for credentialed information. In the event it is determined that no credentials available to the user satisfy the request for credentialed information, control passes to 1102. In 1102, an indication is provided that the just in time credential access is not successful, and the process ends. In the event it is determined in 1100 that a credential available to the user satisfies the request for credentialed information, control passes to 1104. In 1104, a next credential available to the user that satisfies the request for credentialed information is selected. In 1106, the selected credential is retrieved. For example, the selected credential is retrieved by querying a database system. In 1108, it is determined whether there are more credentials available to the user that satisfy the request for credentialed information. In the event it is determined that there are more credentials available to the user that satisfy the request for credentialed information, control passes to 1104. In the event it is determined that there are not more credentials available to the user that satisfy the request for credentialed information, control passes to 1110. In 1110, an indication is provided that the just in time credential access is successful.

Figure 12:
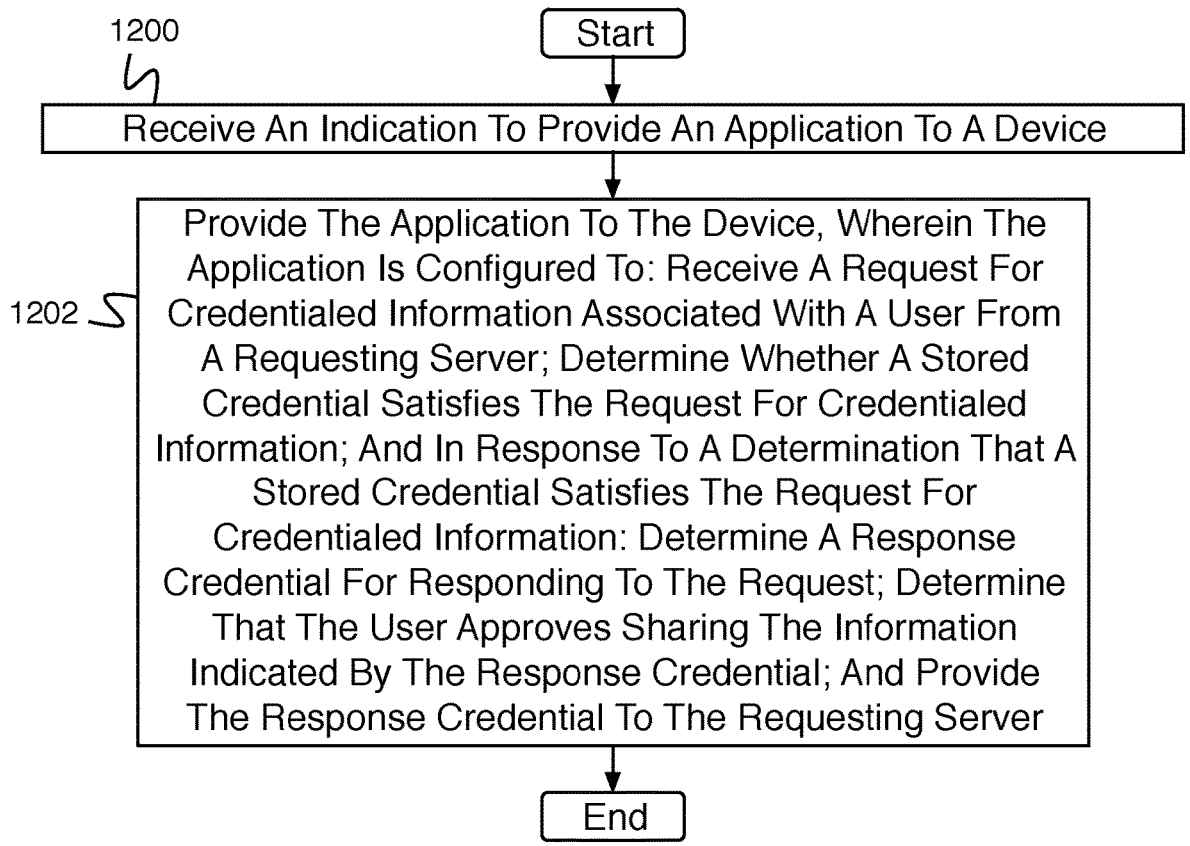
FIG. 12 is a flow diagram illustrating an embodiment of a process for providing an application.

FIG. 12 is a flow diagram illustrating an embodiment of a process for providing an application. In some embodiments, the process of FIG. 12 is executed by database system 104 of FIG. 1. In the example shown, in 1200, an indication to provide an application to a device is received. In 1202, the application is provided to the device, wherein the application is configured to receive a request for credentialed information associated with a user from a requesting server, determine whether a stored credential satisfies the request for credentialed information, and in response to a determination that a stored credential satisfies the request for credentialed information: determine a response credential for responding to the request, determine that the user approves sharing the information indicated by the response credential, and provide the response credential to the requesting server.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for providing an application, comprising:
an interface configured to:
receive an indication to provide an application to a device; and
a processor configured to:
provide the application to the device, wherein the application is configured to:
receive a request for credentialed information associated with a user from a requesting server;
determine whether two or more stored credentials of a set of stored credentials satisfy the request for the credentialed information; and in response to a determination that two or more stored credentials of a set of stored credentials satisfy the request for the credentialed information:
  determine a response credential for responding to the request, comprising to select as the response credential a stored credential of the two or more stored credentials having a lowest level of specificity of personal information of the user;
  determine that the user approves sharing the information indicated by the response credential; and
  provide the response credential to the requesting server.

2. A system for sharing credential information, comprising:
an interface configured to:
  receive a request for the credentialed information associated with a user from a requesting server; and
a processor configured to:
  determine whether two or more stored credentials of a set of stored credentials satisfy the request for the credentialed information; and
  in response to a determination that two or more stored credentials of a set of stored credentials satisfy the request for the credentialed information:
    determine a response credential for responding to the request, comprising to select as the response credential a stored credential of the two or more stored credentials having a lowest level of specificity of personal information of the user;
    determine that the user approves sharing the information indicated by the response credential; and
    provide the response credential to the requesting server.

3. The system of claim 2, wherein the processor is further configured to:
receive a credential sharing application issued by the server system; and
install the credential sharing application.

4. The system of claim 2, wherein the request for the credentialed information is in response to a user request to perform an action.

5. The system of claim 4, wherein the credentialed information is based at least in part on the action.

6. The system of claim 2, wherein determining whether the stored credential satisfies the request for the credentialed information comprises unlocking local storage and scanning stored credentials.

7. The system of claim 2, wherein determining the response credential comprises determining a set of stored credentials that satisfies the request for the credentialed information.

8. The system of claim 7, wherein determining the response credential further comprises prompting the user to select a credential of the set of stored credentials that satisfy the request for the credentialed information.

9. The system of claim 7, wherein determining the response credential further comprises automatically selecting a credential of the set of stored credentials that satisfy the request for the credentialed information that indicates a least personal information.

10. The system of claim 2, wherein the request for the credentialed information is in response to a user accessing a URL, scanning a bar code, receiving a push notification, or scanning a QR code.

11. The system of claim 2, wherein a credential verifier is configured to:
look up a key based at least in part on a ID stored by the credential;
determine whether the response credential has been revoked using a revocation ledger;
determine an authenticity of the response credential by checking an issuer signature;
determine whether the response credential satisfies the request for the credentialed information; and
provide an indication that the response credential satisfies the request for the credentialed information.

12. The system of claim 2, wherein an authenticity of the response credential is determined by additionally checking a credential holder signature or a credential verifier binding.

13. The system of claim 2, wherein determining that the user approves sharing the information indicated by the stored credential comprises providing privacy information to the user and receiving an approval indication; including a local user system authentication, from the user that the user approves the privacy information.

14. The system of claim 2, wherein the processor is further configured to, in response to a determination that the stored credential does not satisfy the request for the credentialed information:
determine whether an available credential available to the user satisfies the request for the credentialed information;
in response to a determination that the available credential satisfies the request for the credentialed information:
  provide an available indication of the available credential;
  create a just in time server credential request;
  provide the just in time server credential request to a server system;
  receive the available credential;
  determine that the user approves sharing the information indicated by the available credential;
  provide the available credential to a credential verifier.

15. The system of claim 2, wherein the processor is further configured to store a stored indication that the stored credential was shared with the requesting server.

16. The system of claim 2, wherein the processor is further configured to receive a verify indication from a credential verifier that the credential was verified.

17. The system of claim 2, wherein the processor is further configured to provide satisfied indication to the user that the request for credentialed information was satisfied.

18. A method for providing an application, comprising:
receiving an indication to provide an application to a device; and
providing, using a processor, the application to the device, wherein the application is configured to:
  receive a request for credentialed information associated with a user from a requesting server;
  determine whether two or more stored credentials of a set of stored credentials satisfy the request for the credentialed information; and
  in response to a determination that two or more stored credentials of a set of stored credentials satisfy the request for the credentialed information:
    determine a response credential for responding to the request, comprising to select as the response credential a stored credential of the two or more stored credentials having a lowest level of specificity of personal information of the user;

determine that the user approves sharing the information indicated by the response credential; and provide the response credential to the requesting server.

19. A computer program product for providing an application, the computer program product being embodied in a non-transitory computer readable storage medium and comprising computer instructions for:

receiving an indication to provide an application to a device; and providing the application to the device, wherein the application is configured to:

receive a request for credentialed information associated with a user from a requesting server;

determine whether two or more stored credentials of a set of stored credentials satisfy the request for the credentialed information; and in response to a determination that two or more stored credentials of a set of stored credentials the request for the credentialed information:

determine a response credential for responding to the request, comprising to select as the response credential a stored credential of the two or more stored credentials having a lowest level of specificity of personal information of the user;

determine that the user approves sharing the information indicated by the response credential; and provide the response credential to the requesting server.

20. A system for providing an application, comprising:

an interface configured to:

receive an indication to provide an application to a device; and a processor configured to:

provide the application to the device, wherein the application is configured to:

receive a request for credentialed information associated with a user from a requesting server;

determine whether two or more stored credentials of a set of stored credentials satisfy the request for the credentialed information; and in response to a determination that two or more stored credentials of a set of stored credentials satisfy the request for the credentialed information:

determine a response credential for responding to the request, comprising to select as the response credential a stored credential of the two or more stored credentials having a lowest level of specificity of verification information of the user;

determine that the user approves sharing the information indicated by the response credential; and provide the response credential to the requesting server.

21. A system for sharing credential information, comprising:

an interface configured to:

receive a request for the credentialed information associated with a user from a requesting server; and a processor configured to:

determine whether two or more stored credentials of a set of stored credentials satisfy the request for the credentialed information; and in response to a determination that two or more stored credentials of a set of stored credentials satisfy the request for the credentialed information:

determine a response credential for responding to the request, comprising to select as the response credential a stored credential of the two or more stored credentials having a lowest level of specificity of verification information of the user;

determine that the user approves sharing the information indicated by the response credential; and provide the response credential to the requesting server.

22. A method for providing an application, comprising:

receiving an indication to provide an application to a device; and providing, using a processor, the application to the device, wherein the application is configured to:

receive a request for credentialed information associated with a user from a requesting server;

determine whether two or more stored credentials of a set of stored credentials satisfy the request for the credentialed information; and in response to a determination that two or more stored credentials of a set of stored credentials satisfy the request for the credentialed information:

determine a response credential for responding to the request, comprising to select as the response credential a stored credential of the two or more stored credentials having a lowest level of specificity of verification information of the user;

determine that the user approves sharing the information indicated by the response credential; and provide the response credential to the requesting server.

23. A computer program product for providing an application, the computer program product being embodied in a non-transitory computer readable storage medium and comprising computer instructions for:

receiving an indication to provide an application to a device; and providing the application to the device, wherein the application is configured to:

receive a request for credentialed information associated with a user from a requesting server;

determine whether two or more stored credentials of a set of stored credentials satisfy the request for the credentialed information; and in response to a determination that two or more stored credentials of a set of stored credentials satisfy the request for the credentialed information:

determine a response credential for responding to the request, comprising to select as the response credential a stored credential of the two or more stored credentials having a lowest level of specificity of verification information of the user;

determine that the user approves sharing the information indicated by the response credential; and provide the response credential to the requesting server.

* * * * *